(No Model.) 2 Sheets—Sheet 1.

J. B. CHURCH.
PHOTOGRAPHIC SHUTTER.

No. 440,137. Patented Nov. 11, 1890.

Witnesses
E. L. Smith
Thomas Durant

Inventor
Joseph B. Church
By his Attorneys
Church & Church (No Model.) 2 Sheets—Sheet 2.

J. B. CHURCH.
PHOTOGRAPHIC SHUTTER.

No. 440,137. Patented Nov. 11, 1890.

Witnesses
E. D. Smith
Thomas Durant

Inventor
Joseph B. Church
By his Attorneys
Church & Church

UNITED STATES PATENT OFFICE.

JOSEPH B. CHURCH, OF WASHINGTON, DISTRICT OF COLUMBIA, ASSIGNOR TO THE EASTMAN DRY PLATE AND FILM COMPANY, OF ROCHESTER, NEW YORK.

PHOTOGRAPHIC SHUTTER.

SPECIFICATION forming part of Letters Patent No. 440,137, dated November 11, 1890.

Application filed December 2, 1889. Serial No. 332,279. (No model.)

*To all whom it may concern:*

Be it known that I, JOSEPH B. CHURCH, of Washington, in the District of Columbia, have invented certain new and useful Improvements in Photographic Shutters; and I do hereby declare the following to be a full, clear, and exact description of the same, reference being had to the accompanying drawings, forming a part of this specification, and to the letters of reference marked thereon.

My present invention relates to and constitutes an improvement upon the shutter mechanism invented by George Eastman and patented to him August 6, 1889, No. 408,596. The characteristic feature of said patented device, in so far as the present invention is concerned, is the employment of a supplemental or auxiliary shutter co-operating with the exposing-aperture therein while resetting the main shutter.

In the Eastman device the resetting devices operate upon the main shutter and through the latter upon the auxiliary shutter, and a detent is arranged to engage in the auxiliary shutter and retain it in line with the lens during the passage of the exposing-aperture of the main shutter, after which the auxiliary is released from the detent and permitted or caused to return to its normal position.

Now, according to my present invention the resetting devices are connected to the auxiliary instead of the main shutter and the automatic grip or detent for acting upon the auxiliary is dispensed with. This modification in construction involves a corresponding change in the mode of operation, the resetting devices actuating the auxiliary to first close the exposing-aperture in the main shutter and subsequently move the latter across the lens-opening into position to be operated in making an exposure, the auxiliary being withdrawn to uncover or open the exposing-aperture in the main shutter after the latter has passed the lens.

Aside from these general features of improvement there are others relating to the construction and arrangement of the parts comprising the apparatus, as will be hereinafter fully described, and pointed out in the claims.

Figure 1:
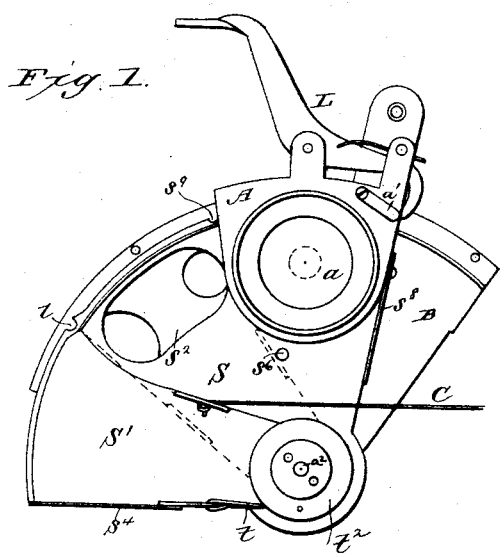
Figure 2:
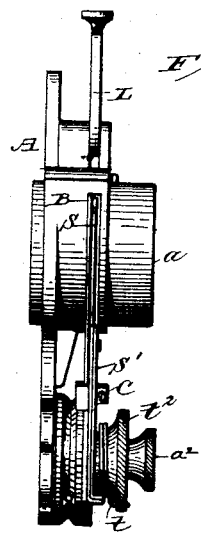
Figure 3:
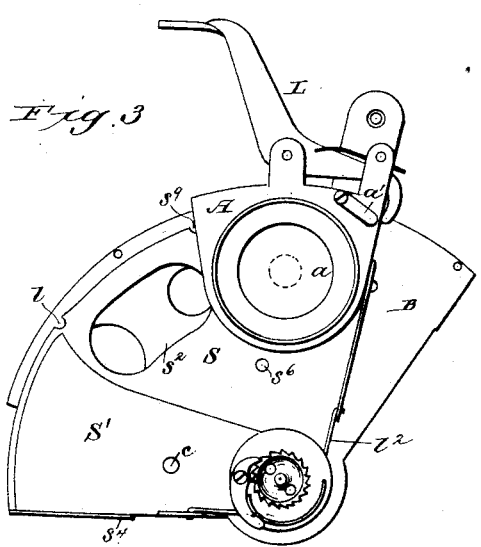
Figure 4:
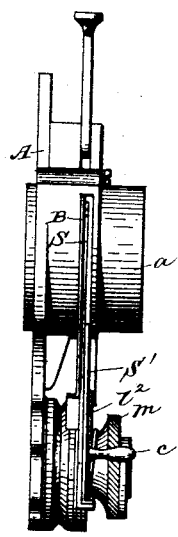
Figure 5:
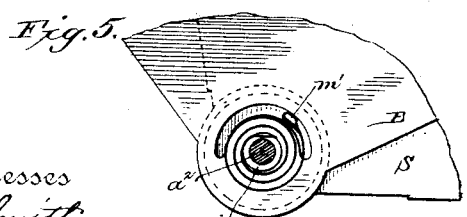
Figure 6:
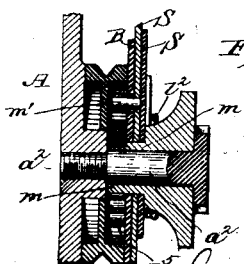
Figure 7:
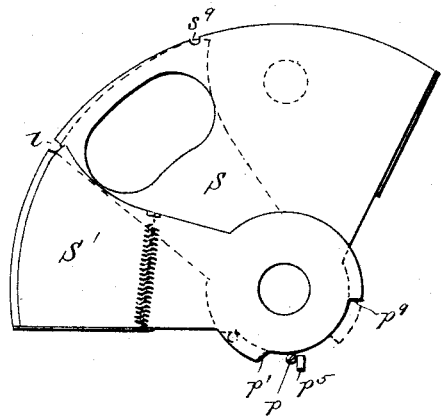
Figure 9:
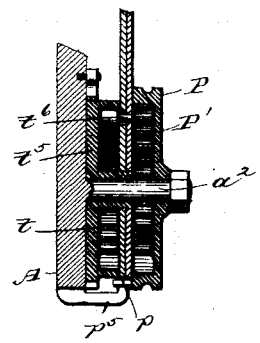
Figure 8:
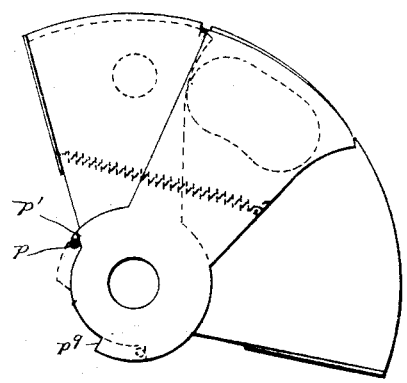
Figure 10:
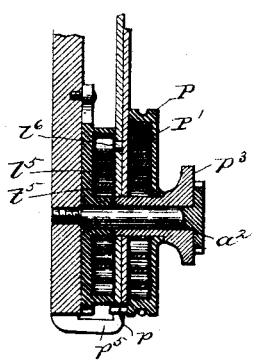
Figure 11:
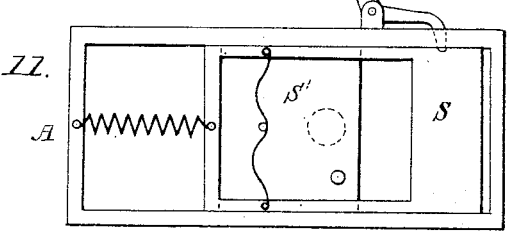

In the accompanying drawings, Figure 1 is a side elevation, and Fig. 2 an edge view, of a form of shutter mechanism illustrating one adaptation of my invention, a single spring being applied for actuating both shutters or sections. Fig. 3 is a side elevation, and Fig. 4 an edge view, of a shutter mechanism provided with separate impelling-springs for the two shutters or sections. Figs. 5 and 6 are detail views illustrating the construction and arrangement of the impelling devices for the shutter shown in Figs. 3 and 4. Figs. 7 and 8 are diagrammatic views illustrating the two shutters or sections in different positions, also showing a slight modification in form to accommodate a special form of resetting mechanism. Fig. 9 is a sectional view of the single spring-shutter with spring-pulley-resetting mechanism. Fig. 10 is a sectional view showing application of spring-pulley-resetting device to double-spring shutter. Fig. 11 is a diagrammatic view illustrating a modification in the form and arrangement of the shutters or sections.

Similar letters of reference in the several figures indicate the same parts.

The shutter mechanism forming the subject of this invention is designed more especially for use in making what are known as "instantaneous exposures," and it is particularly adapted for use in connection with de-detective cameras—such as the "Kodak"—provided with roller-holders or other means for presenting successive portions or sections of a strip of sensitized material in position to receive the impression of light transmitted through the lens.

Referring to the drawings, A designates a frame or support arranged for attachment to the camera and provided with apertures or sockets *a* for the reception of the lenses, and B is an adjustable diaphragm-plate provided with a series of graduated apertures, said plate being pivotally supported and movable transversely of the lens-axis to present different apertures in line therewith, and held in adjusted position by a spring-detent *a'* or equivalent device.

In the present instance the shutter is arranged to move transversely of the axis of the lens-opening and between the lenses applied to the sockets $a$; but it is obvious that it may be otherwise located with respect to the lens, so long as its movement is across the aperture through which light is admitted to the sensitive plate or film within the camera.

The shutter proper comprises at least two independently-movable sections S S', herein denominated, for convenience, the "main" and "auxiliary" shutters. Both of these shutters are arranged to reciprocate in a plane or planes transverse to and intersecting the exposing aperture or axis of the lens, their reciprocating motions taking place in curved or straight lines, as preferred.

As shown in Figs. 1 to 10, the shutters are arranged, for convenience, to traverse in arcs of circles, and in Fig. 11 they are indicated as moving in right lines.

Referring more particularly to Figs. 1 and 2, wherein the shutters are shown retracted after an exposure has been completed and preliminary to being reset for another exposure, the main and auxiliary shutters S S' are pivotally supported upon a pin $a^2$, affixed to the support A. The main shutter S is provided with an exposing aperture or opening $s^2$ in line with the axis of the lens-tube, and two stops $s^4$ $s^6$ are provided, between which the auxiliary shutter S' is free to move independently of the main shutter. When in engagement with the stop $s^4$—that is, when retracted—the auxiliary shutter S' is withdrawn from the aperture $s^2$, leaving the latter uncovered; and when said auxiliary shutter is in contact with stop $s^6$ it covers the aperture $s^2$ and prevents the passage of light therethrough.

The tension or driving device, here represented as a spring $t$, is connected to the auxiliary shutter S' in a manner to hold the latter in contact with stop $s^4$ and by the pressure exerted thereon to carry the main shutter S to one side of the lens, as represented in Fig. 1. When in this position, the lens-opening is closed by the opaque portion of the shutter, the latter being held from further motion to the left by a stop $s^8$, engaging a portion of the frame. The resetting device in this instance (illustrated by the cord C) is connected to the auxiliary shutter S' and arranged to operate in opposition to the pressure of the tension device or spring $t$. When pulling the cord or otherwise actuating the resetting devices, the auxiliary shutter S' is drawn back against the pressure of the spring until it fully covers the aperture $s^2$ in the main shutter, when it makes contact with stop $s^4$, and through the latter draws the main shutter back with it until the lens opening or tube has been passed.

A suitable detent is provided for holding and releasing the shutter when in position for making an exposure, such a device being represented in the drawings by the pivoted latch L, co-operating with a shoulder $l$ upon the main shutter. When the main shutter has been retracted sufficiently to cause the engagement of the latch and the resetting device is released, the auxiliary shutter S' is moved back by the spring, thus uncovering the exposing-aperture $s^2$ in the main shutter and transferring the pressure of the spring to the stop $s^6$, so that as the latch is withdrawn from engagement with the main shutter, or the latter is otherwise released, the spring will operate to impel both shutters or sections S S'. It will be observed that in this instance a single spring serves both to retract the auxiliary shutter and to impel both sections of the shutter in effecting an exposure; but under certain circumstances it is desirable to employ a different or weaker spring for the auxiliary and a separate stronger spring for the main shutter. A construction of this kind is illustrated in Figs. 3 to 6, wherein a spring $l^2$ is interposed between the auxiliary and main shutters to hold the former against the stop $s^4$, while a separate spring $l^5$ is connected to the main shutter for impelling the latter. A convenient assemblage of parts is here found. The spring $l^5$ is coiled about the pin $a^2$, its inner end being attached to a sleeve $m$ (extending through both shutters and the diaphragm-plate) and its outer end engaging a pin $m'$ on the main shutter, said pin projecting through a slot formed in the diaphragm-plate to permit the adjustment of the latter. The sleeve $m$ forms the pivot for the shutters, and is held in adjusted position by a ratchet or equivalent connection with a stationary object, such as the head of pin $a^2$.

Similar provision for adjusting the tension of the impelling-spring is made in the device shown in Figs. 1 and 2, wherein the inner end of spring $t$ is secured to an adjustable collar $t^2$ on pin $a^2$, and in the modifications shown in Figs. 9 and 10, wherein the impelling-spring $t$, Fig. 9, is attached at one end to an adjustable casing or support $t^5$, the opposite end being applied to a pin $t^6$ on the auxiliary shutter, said pin extending through a slot in the main shutter, and the spring $l^5$, Fig. 10, similarly connected to the adjustable casing $t^5$ and to a pin $l^6$ on the main shutter. The modifications in the arrangement of the impelling-springs shown in these figures correspond, respectively, with the different applications of springs illustrated in Figs. 1 and 3—that is to say, in Fig. 9 the impelling-spring is arranged to operate upon the auxiliary and through the latter upon the main shutter, as in Fig. 1, whereas in Fig. 10 the spring operates only upon the main shutter, as in Fig. 3.

As is obvious, any suitable form or construction of resetting device may be employed which operates to draw the auxiliary shutter over the exposing-aperture before actuating the main shutter, and two such forms are shown in Figs. 1 and 3—in the former a cord and in the latter a knob $c$.

An improved form and application of resetting device is represented in Figs. 9 and 10, the same comprising a spring-retracted arm or pulley P, provided with a pin or projection $p$, arranged to engage a shoulder $p'$ on the auxiliary shutter. The pulley (or arm) P is mounted to rotate or pivot on the pin $a^2$ and contains a spring P', one end attached to the pulley and the other to a fixed support, such as the pin $a^2$ in Fig. 9 or the adjustable collar or sleeve $p^3$ in Fig. 10. The spring P' is arranged to hold the pulley retracted—that is, to rotate the latter in the direction of the movement of the shutter when making an exposure, and a stop $p^5$ serves to limit the movement of the pulley in that direction.

After an exposure has been made and preliminary to resetting the shutter stands in the position indicated in Fig. 7, the pin $p$ of pulley P being held by the spring in contact with the stop $p^5$. When it is desired to reset the shutter, the cord (of which one end is secured to the pulley) is pulled, thereby rotating the pulley against the tension of its spring until the pin $p$ makes contact with the shoulder $p'$ on the auxiliary shutter. A further movement of the pulley advances the auxiliary shutter to the position shown in dotted lines, Fig. 7, thereby closing the aperture in the main shutter, after which both shutters are moved together across the lens-aperture (indicated by dotted lines) into the position shown by full lines in Fig. 8, where it is engaged and held by the detent. Upon releasing the cord the pulley is rotated by its spring to wind up the cord and release the auxiliary shutter, which latter, under the influence of its spring, is drawn back to the position indicated by dotted lines in Fig. 8, uncovering the aperture in the main shutter. Should the auxiliary shutter fail to be fully retracted, or should the spring be too light to start said shutter, the pin $p$ on the pulley, by engaging a shoulder $p^9$ on the auxiliary shutter, will compel or assist the withdrawal of said shutter to fully uncover the aperture in the main shutter preliminary to the release of the latter. When it is desired to make provision for time exposures, the main shutter S may be provided with a notch $s^9$, to receive the catch and hold the shutter in an intermediate position with its aperture in line with the lens. The auxiliary shutter or a portion thereof on the inner side may be constructed to cover said notch, as the auxiliary is drawn to one side in resetting the shutter to hold the detent elevated and prevent its catching in the notch $s^9$ when resetting the shutter.

It is obvious that the several stops, shoulders, and pins or projections may be arranged and located otherwise than as shown in the drawings, provided their co-operative action is preserved, and that different-known forms of springs or impelling devices, detents, and resetting devices may be employed in lieu of those described and shown, without departing from the spirit of my invention.

Moreover, although I have heretofore described the present improvements as applied to shutters moving in arcs of circles, and have referred to the main shutter as containing the exposing-aperture, I do not wish to be understood as limiting my invention in these particulars, as the shutters may be arranged to move in right lines, as indicated in Fig. 11, and instead of providing the main shutter with an exposing aperture or opening the latter may be formed between the auxiliary and main shutters by making the auxiliary of sufficient width to cover the lens-aperture when drawn forward to the resetting position, as indicated in said figure.

If the exposing-aperture is formed between the movable sections of the shutter, care must be taken to form a light tight joint at the meeting edges, when the section S' is drawn against section S preliminary to the movement past the lens in resetting.

Having thus described my invention, what I claim as new is—

1. In a photographic shutter, the combination, with the main and auxiliary shutters, of a retracting device for the main shutter, a separate retracting device for the auxiliary shutter, and a resetting device engaging the auxiliary shutter to first close or cover the exposing-aperture and subsequently retract the main shutter, substantially as described.

2. In a photographic shutter, the combination, with the main shutter or section and the auxiliary shutter or section, of a retracting-spring for the auxiliary shutter, a separate retracting-spring for the main shutter, and a resetting device connected to the auxiliary shutter and operating in opposition to both retracting-springs to actuate the shutters successively, substantially as described.

3. In a photographic shutter, the combination, with the main shutter and an auxiliary shutter movable between stops on the main shutter, of an impelling device for the main shutter, an impelling or retracting device for the auxiliary shutter moving with the main shutter, and a resetting device connected to the auxiliary shutter, substantially as described.

4. In a photographic shutter, the combination, with the main and auxiliary shutters, the latter movable between stops on the former, of a retracting device engaging the auxiliary shutter, a retracting device of greater power engaging the main shutter, and a resetting device engaging the auxiliary shutter, whereby in setting the shutter the retracting device for the auxiliary shutter will be compressed before motion is communicated to the main shutter, substantially as described.

5. In a photographic shutter, the combination, with the main and auxiliary shutters and retracting devices therefor, of a resetting device engaging the auxiliary shutter and provided with an independent retracting device—such as a spring—for returning the resetting device, substantially as described.

6. In a photographic-shutter mechanism such as described, the combination, with the main and auxiliary shutters, the latter movable independently of the former to close and uncover the exposing-aperture, and a spring engaging the auxiliary shutter to hold it retracted with the exposing-aperture uncovered, of a resetting device provided with a spring-retracted pulley or arm carrying a pin or projection for engaging the auxiliary shutter to advance the latter against the pressure of its retracting-spring, substantially as and for the purpose set forth.

7. In a photographic-shutter mechanism such as described, the combination, with the main and supplemental shutters and their pivot-pin, of the diaphragm-plate mounted upon said pivot-pin and provided with a detent and the impelling-spring connected to the pin on main shutter, said pin extending through a slot in the diaphragm-plate, with the spring in rear of said plate, substantially as described.

8. In a photographic-shutter mechanism such as described, the combination, with the main and auxiliary shutters and their impelling-spring, of the spring-retracted pulley provided with a shoulder engaging a shoulder on the auxiliary shutter and a stop for limiting the movement of the pulley when retracted by its springs, substantially as and for the purpose set forth.

9. In a photographic-shutter mechanism, the combination, with the main and auxiliary shutters operating substantially as described and provided with impelling and detent devices, of a resetting device provided with a pin or shoulder movable between shoulders on the auxiliary shutter, said resetting device operating when moved in one direction to advance the auxiliary shutter and cover the exposing-aperture, and when moved in the opposite direction to retract the auxiliary shutter and uncover the exposing-aperture, substantially as described.

10. In a photographic-shutter mechanism, the combination, with the main and auxiliary shutters co-operating, substantially as described, and provided with impelling and detent devices, of a spring-retracted resetting device provided with a pin or shoulder movable between and engaging shoulders on the auxiliary shutters to alternately advance and retract the latter independently of the main shutter, and thereby close and open the exposing-aperture, substantially as and for the purpose set forth.

11. In a photographic-shutter mechanism such as described, the combination of the main and auxiliary shutters pivotally supported to reciprocate across the lens-opening, an impelling-spring attached to one of said shutters and to an adjustable support, and a spring-retracted pulley mounted upon the pivot-pin and provided with a shoulder engaging a shoulder on the auxiliary shutter, substantially as and for the purpose set forth.

12. In a photographic-shutter mechanism such as described, the combination of the main and auxiliary shutters mounted upon a pivot, the adjustable support carrying a spring engaging one of said shutters, the pulley mounted upon said pivot, the spring for retracting said pulley, the pin carried by said pulley and engaging a shoulder on the auxiliary shutter, and the stop for limiting the movement of the pulley when retracted by its spring, substantially as and for the purpose set forth.

JOSEPH B. CHURCH.

Witnesses:
MELVILLE CHURCH,
ALEX. S. STEUART.